(12) United States Patent
Grupeli et al.

(10) Patent No.: US 11,606,199 B2
(45) Date of Patent: Mar. 14, 2023

(54) MANAGEMENT OF GROUPS OF CONNECTED OBJECTS USING WIRELESS COMMUNICATION PROTOCOLS

(71) Applicant: ORANGE, Issy-les-Moulineaux (FR)

(72) Inventors: Franck Grupeli, Chatillon (FR); Philippe Michel, Chatillon (FR); Stephane Mangon, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 256 days.

(21) Appl. No.: 16/651,201

(22) PCT Filed: Sep. 28, 2018

(86) PCT No.: PCT/FR2018/052390
§ 371 (c)(1),
(2) Date: Mar. 26, 2020

(87) PCT Pub. No.: WO2019/063950
PCT Pub. Date: Apr. 4, 2019

(65) Prior Publication Data
US 2020/0295927 A1    Sep. 17, 2020

(30) Foreign Application Priority Data
Sep. 28, 2017 (FR) ...................... 1759043

(51) Int. Cl.
*H04L 9/08* (2006.01)
*H04L 9/40* (2022.01)
*H04W 12/0433* (2021.01)

(52) U.S. Cl.
CPC .......... *H04L 9/0833* (2013.01); *H04L 9/0822* (2013.01); *H04L 63/065* (2013.01); *H04W 12/0433* (2021.01)

(58) Field of Classification Search
CPC ..... H04W 4/70; H04W 12/0433; H04W 4/08; H04W 12/0431; H04W 12/041;
(Continued)

(56) References Cited

U.S. PATENT DOCUMENTS 5,867,665 A * 2/1999 Butman ................. H04L 29/06
                                                      709/239
6,028,998 A * 2/2000 Gloudeman ............. G06F 8/24
                                                      717/108
(Continued)

FOREIGN PATENT DOCUMENTS

WO     2012104725 A2    8/2012

OTHER PUBLICATIONS

English translation of the Written Opinion of the International Searching Authority dated Feb. 14, 2019 for corresponding International Application No. PCT/FR2018/052390, filed Sep. 28, 2018.
(Continued)

*Primary Examiner* — Samson B Lemma
(74) *Attorney, Agent, or Firm* — David D. Brush; Westman, Champlin & Koehler, P.A.

(57) ABSTRACT

Management of a group of connected objects in a communications network including at least one local network. The connected objects, known as client objects, have at least one functional attribute. The method includes: obtaining an identifier of the group and an encryption key of the group); assigning the group at least one connected object according to at least one functional attribute of the connected object; obtaining an encryption key of the object; encrypting the encryption key of the group using the encryption key of the object; transmitting the identifier of the group, and the encrypted encryption key of the group to the at least one connected object.

18 Claims, 3 Drawing Sheets

(58) Field of Classification Search
CPC .... H04W 88/08; H04L 9/0822; H04L 63/065; H04L 9/0833; H04L 63/062; G05B 15/02; G05B 2219/2642; G06F 8/24; G06F 9/45512
See application file for complete search history.

(56) References Cited

U.S. PATENT DOCUMENTS

| | | | | |
|---|---|---|---|---|
| 6,530,020 | B1* | 3/2003 | Aoki | H04L 9/3255 380/278 |
| 8,204,228 | B2* | 6/2012 | Weis | H04L 9/0833 726/26 |
| 8,798,273 | B2* | 8/2014 | Rich | H04L 63/0823 380/278 |
| 8,954,740 | B1* | 2/2015 | Moscaritolo | H04L 63/065 380/278 |
| 2005/0152542 | A1* | 7/2005 | Zheng | H04L 9/3213 380/30 |
| 2009/0147958 | A1* | 6/2009 | Calcaterra | H04L 9/0833 380/260 |
| 2010/0142711 | A1* | 6/2010 | Weis | H04L 9/3213 380/277 |
| 2013/0044878 | A1* | 2/2013 | Rich | H04L 9/083 380/277 |
| 2014/0233736 | A1* | 8/2014 | Zhang | H04L 63/065 380/270 |
| 2014/0241354 | A1* | 8/2014 | Shuman | H04L 12/2803 370/390 |
| 2015/0169892 | A1* | 6/2015 | Nord | G06F 21/602 726/9 |
| 2020/0259639 | A1* | 8/2020 | Wall | H04L 9/0833 |

OTHER PUBLICATIONS

International Search Report dated Feb. 7, 2019 for corresponding International Application No. PCT/FR2018/052390, filed Sep. 28, 2018.
Written Opinion of the International Searching Authority dated Feb. 7, 2019 for corresponding International Application No. PCT/FR2018/052390, filed Sep. 28, 2018.

* cited by examiner

MANAGEMENT OF GROUPS OF CONNECTED OBJECTS USING WIRELESS COMMUNICATION PROTOCOLS

CROSS-REFERENCE TO RELATED APPLICATIONS

This Application is a Section 371 National Stage Application of International Application No. PCT/FR2018/052390, filed Sep. 28, 2018, which is incorporated by reference in its entirety and published as WO 2019/063950 A1 on Apr. 4, 2019, not in English.

TECHNICAL FIELD

The invention relates to the general field of telecommunication networks, and more particularly to the Internet of Things.

PRIOR ART

Over the last few years now, the Internet of Things—or IoT—has been deployed to the general public and in the professional world. Connected objects are for example domestic objects such as light bulbs, lamps, radiators or else audio and video appliances, electricity meters, vehicles, irrigation systems, etc. The connected objects dialog with one another via several categories of network:
- wired telecommunication networks, belonging to traditional operators, which offer high-speed and long-distance connection technologies, hereinafter called WAN (wide area network);
- wireless radio networks, which are themselves divided into various categories:
  - long-range high-speed technologies of mobile protocol type (2G, 3G, 4G, etc.), belonging to telecommunication operators, long-distance technologies or else low-speed technologies such as for example LoRa (long-range wide-area), or SigFox (a low-speed cellular network);
  - medium-range technologies such as Z-wave, Wi-Fi, etc.
  - short-range technologies, such as NFC (near-field communication), Bluetooth, BLE, Zigbee, etc.
- in addition to these radio protocols, certain light networks (Li-Fi) or audio networks, equivalent to non-wired protocols, may also be used.

Wireless networks are hereinafter of more particular interest.

Within one and the same network, all of the objects do not have the same functions: some of them propose to feed back measurement results (temperature sensors, humidity sensors, motion sensors, etc.), others offer communication functions (smartphones, tablets, etc.), others also store data, etc. One and the same object may moreover offer a plurality of functions: a connected lock may lock or unlock but also send an alert message, provide information about the temperature, etc.

These objects need to dialog with one another securely but also coherently: in a hospital for example, the feedback of information regarding a patient's health data is confidential, that is to say that it requires secure communication, on the one hand, and does not have any meaning other than for the objects intended to process these data, that is to say that share the function "patient's health data", on the other hand. As a terminal intended for firemen or the oven in the cafeteria does not know what to do with this information, it is not coherent to transmit said information to them, even though these connected objects are within the perimeter of the local area network of the hospital. According to another example, if a baby is snatched within the grounds of the hospital, it makes sense for the doors to close, but there is no need for the fire alarms to be triggered. There is therefore a need for coherent communication between the connected objects.

However, generally speaking, local area networks, in particular wireless ones, operate in broadcast mode, that is to say that all of the objects in the local area network are able to receive a message (containing the confidential data of a patient, according to a previous example) or even process it, possibly for fraudulent purposes, if it is not encrypted.

There are nowadays solutions so that such objects dialog with one another securely. For example, the abovementioned LoRa and Sigfox networks allow such exchanges via their protocol servers (LoRa, LETM). Within a local area network, it is also possible to make the objects dialog with one another securely (for example on a BLE—Bluetooth Low Energy link, or by way of the service gateway).

However, these methods do not make it possible to take into account the various functions of the objects in a local area network such that these objects dialog with one another coherently.

The invention offers a solution that does not exhibit the drawbacks from the prior art.

The Invention

To this end, according to one functional aspect, one subject of the invention is a method for managing a group of connected objects in a communication network comprising at least one local area network, said connected objects, called client objects, having at least one functional attribute, said method being characterized in that it comprises the following steps:
- obtaining an identifier of the group and an encryption key of the group for said group;
- assigning at least one connected object to the group on the basis of at least one functional attribute of said connected object;
- obtaining an encryption key of the object;
- encrypting the encryption key of the group using the encryption key of the object;
- transmitting, to said at least one connected object:
  - the identifier of the group;
  - and the encrypted encryption key of the group.

"Functional attribute" is understood to mean here an attribute of the object, for example the ability to manage multimedia streams, to provide a temperature, an alarm, etc. A list of functional attributes may be predefined in the local area network or standardized by a standardization body, etc.

The invention thus makes it possible to group together objects within a local area network according to a functional criterion. It is possible for example to create a first "media" group of objects, a second "sensors" group of objects, a third one called "patient data", etc. As each object of the group receives a group key specific to the group, which it alone is able to decrypt by virtue of its unique object encryption key, it is thus possible to limit the communication of messages to the objects in this group, which will be the only ones with the ability to decrypt the messages subsequently transmitted on the local area network by virtue of the group key. It is thus easily possible to avoid confidential messages being intercepted and decrypted by objects that do not form part of the group. An object that does not form part of the group does not have the key of the group and, even if it manages to intercept it, it is not able to decrypt it. This allows secure and coherent communication between objects of the local area network that are grouped together depending on their functions.

According to one particular mode of implementation of the invention, a method as described above is furthermore characterized in that the assignment step comprises at least the following sub-steps:
  obtaining at least one function of the object;
  obtaining at least one function of the group;
  comparing the two functions;
  assigning the object to the group on the basis of the results of the comparison.

This mode of implementation of the invention makes it possible to very easily construct a discussion group: if the functions of the object are compatible with those of the group, then the object is assigned to the group, that is to say that it forms part of the group. This operation may be performed when the object is initialized, or later on after the group has been created. The comparison may take various forms. Indeed, the equivalence between the functions is not necessarily strict: if the object is for example a hard disk, one of its functions is implicitly storage, and it may therefore be assigned to a storage group. Another of its functions is storing media, and it may therefore be associated with a media management group, etc. The equivalence of the functions simply has to be known to the local area network when the group is formed.

According to another particular mode of implementation of the invention, which may be implemented as an alternative or in addition to the previous one, the method for managing a group is furthermore characterized in that the local area network comprises a connected object of server type, called server object, able to generate and store the key of the group.

Advantageously according to this mode, the formation of the groups is entrusted to a privileged object of the local area network, called server object, which takes responsibility for managing the group, and in particular for managing the key of the group that will subsequently serve to authorize the discussion between two objects of the same group. This simplifies the management of the group. The server object may of course itself be a client object.

According to one variant of this particular mode of implementation of the invention, the method for managing a group is furthermore characterized in that the communication network comprises at least two local area networks and in that a first server object of a first local area network is able to communicate with a second server object of a second local area network, and the method comprises the following steps:
  establishing communication between the first and the second server objects;
  receiving, by way of the second server object, an encrypted encryption key and the identifier of a group from the first server object;
  communicating data between the first server object and the second server object in order to establish secure communication between a first object of the first local area network and a second object of the second local area network.

Advantageously according to this variant, the group may be expanded outside of the local area network, through simply exchanging the group key of a first server object of a first local area network with a second server object of a second local area network. The second server is thus able to authorize inter-network communication between objects having the same function by distributing this key to the appropriate objects of its local area network.

According to another particular mode of implementation of the invention, which may be implemented as an alternative or in addition to the previous ones, the method for managing a group is furthermore characterized in that each client object of the local area network belongs to at least one group of objects.

Advantageously according to this mode, each of the objects of the local area network is able to communicate with one or more other objects of the same group, and each object may belong to a plurality of discussion groups.

According to another particular mode of implementation of the invention, which may be implemented as an alternative or in addition to the previous ones, the method for managing a group is furthermore characterized in that the local area network comprises a default group and all of the objects of the local area network are assigned to said default group.

Advantageously according to this mode, each of the objects of the local area network is able to communicate with at least the other objects of the local area network securely, independently of the subsequent assignment of the objects in another discussion group. The default group is the group of the local area network.

According to another functional aspect, the invention relates to a method for communicating in a group of connected objects in a communication network, each connected object, called client object, having at least one function associated with an identifier of a group and an encryption key of the object, said method being characterized in that it comprises the following steps on the object:
  receiving an identifier of the group and the encryption key of the group encrypted by the encryption key of the object;
  receiving a message encrypted by the encryption key of the group;
  decrypting the encryption key of the group using the encryption key of the object;
  decrypting the encrypted message using the encryption key of the group.

According to one hardware aspect, the invention also relates to a server object for forming a group of connected objects in a communication network, comprising at least one local area network, said connected objects, called client objects, having at least one functional attribute, said object being characterized in that it comprises the following modules:
  a module for obtaining an identifier of the group and an encryption key of the group for said group;
  a module for assigning at least one connected object to the group on the basis of at least one functional attribute of said connected object;
  a module for obtaining an encryption key of the object;
  a module for encrypting the encryption key of the group using the encryption key of the object;
  a module for transmitting, to said at least one connected object:
    the identifier of the group,
    and the encrypted encryption key of the group.

According to another hardware aspect, the invention also relates to a client object having at least one function associated with a group identifier and an encryption key of the object, said object being characterized in that it comprises the following modules:

a module for receiving an identifier and an encryption key of the group encrypted by the encryption key of the object;

a module for receiving a message encrypted by the encryption key of the group;

a module for decrypting the encryption key of the group using the encryption key of the object;

a module for encrypting and decrypting the encrypted message using the encryption key of the group.

The term module used in the present description may correspond equally to a software component and to a hardware component or a set of hardware and software components, a software component itself corresponding to one or more computer programs or subroutines or more generally to any element of a program able to implement a function or a set of functions as described for the modules in question. In the same way, a hardware component corresponds to any element of a hardware assembly able to implement a function or a set of functions for the module in question (integrated circuit, chip card, memory card, etc.).

According to another hardware aspect, the invention also relates to a home gateway comprising a server object as described above.

According to another hardware aspect, the invention also relates to a system comprising a server object and at least one client object as described above.

According to another hardware aspect, the invention also relates to a computer program able to be implemented on an object as described above, the program comprising code instructions that, when the program is executed by a processor, performs the steps of the management method and/or of the communication method defined above.

According to yet another hardware aspect, the invention relates to a recording medium able to be read by a data processor and on which a program comprising program code instructions for executing the steps of any one of the methods defined above is recorded.

The objects according to the hardware aspects of the invention afford at least the same advantages as those afforded by the method according to the first functional aspect. The optional features outlined for the first aspect may be applied to the hardware aspects.

The invention will be better understood upon reading the following description, given by way of example and with reference to the appended drawings.

DETAILED DESCRIPTION OF ONE EXEMPLARY EMBODIMENT ILLUSTRATING THE INVENTION

Figure 1:
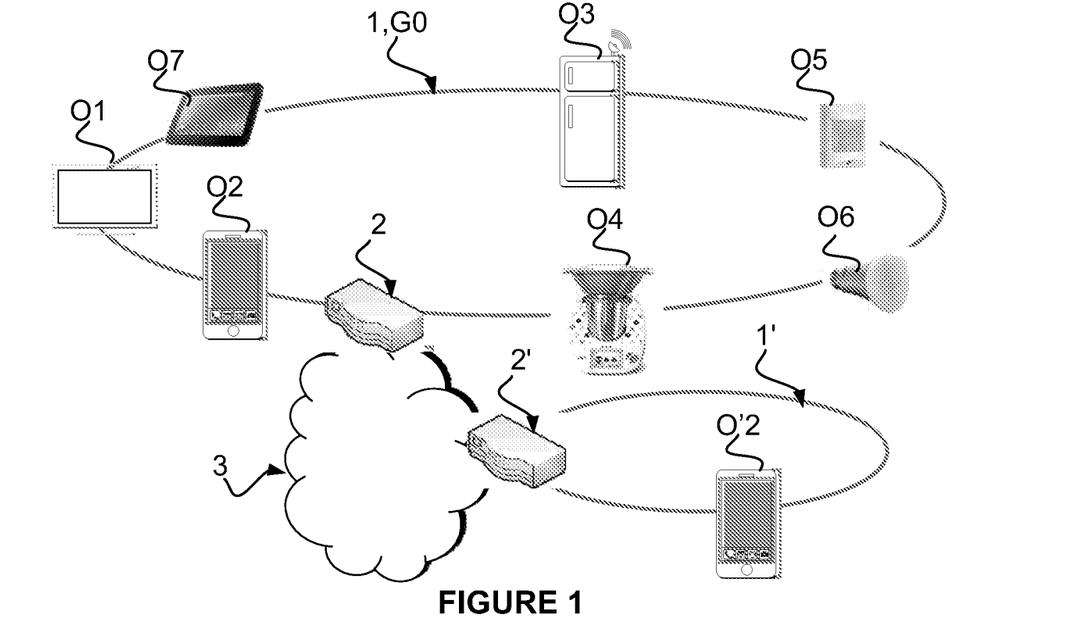
FIG. 1 shows the general context of the invention.

FIG. 1 shows the general context of the invention according to the prior art, in which a telecommunication system comprises a first local area network or LAN 1, a second local area network (1') and a wide area network or WAN 3. According to this nonlimiting example, the LAN networks are home networks and the WAN network is an Internet network. More generally, a LAN network could be a business network and the WAN network 3 could be of any type (cellular, GSM—Global System for Mobile Communications, UMTS—Universal Mobile Telecommunications System, Wi-Fi—wireless, etc.) without departing from the scope of the invention.

A network management element (2) (a home gateway, business gateway, a hub, etc.) and terminal equipments, hereinafter called connected objects or more simply objects (O1-O7) are connected to the local area network 1. According to the example, these are respectively a personal computer PC (O1), a smartphone (O2), a connected refrigerator (O3), a household robot (O4), a motion detector (O5), a lamp (O6) and a digital tablet (O7). These objects are able to communicate on the local area network and may be accessed from inside or outside the local area network via the service gateway (2). It will be noted that these terminals are heterogeneous in nature. They may for example differ in terms of:

their operating system (Windows, Linux, Android, etc.)

their type of connection to the network (Ethernet, Wi-Fi, Bluetooth, etc.);

the actions of which they are capable (measuring the temperature, communicating on social networks, executing a recipe, reading multimedia content, detecting motion, turning on a lamp, etc.). This is what is called the function of the object. It will be noted that this function may be very simple (measuring the temperature) or correspond to a complete scenario (implementing a series of actions on various objects in order to parameterize the home when the user returns home).

The local area network (1') outlined by way of example is managed by a home gateway 2' and comprises a connected object O'2.

A description will now be given of the invention, the purpose of which is to offer secure communication between connected objects of the first local area network (1) and/or of the second local area network (1') with reference to the following figures.

Figure 2:
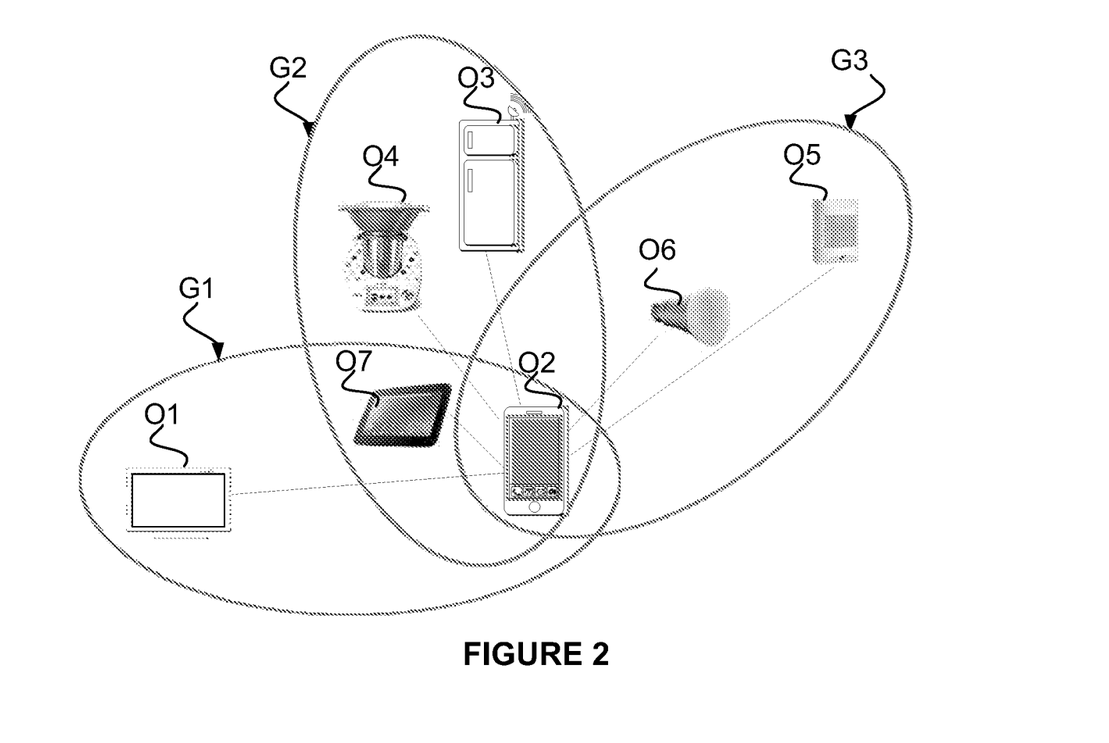
FIG. 2 shows an example of a group of connected objects according to one embodiment of the invention.

FIG. 2 shows one example of a group of connected objects according to one embodiment of the invention. The context is the same as that of FIG. 1, but the objects of the first local area network have been grouped together depending on the functions that they are able to perform. According to this example, an architecture is achieved in which the same function may be shared by a plurality of objects in a group, also called "discussion group". Each discussion group offers a virtual discussion space that is secured by virtue of a dedicated encryption key. In the example of FIG. 2, there are three of these groups:

1. group G1 of personal objects with "media" function (PC O1, tablet O7, smartphone O2); these objects are in particular able to store and/or process multimedia content.

2. group G2 of equipments connected to the household and capable of being used for cookery (refrigerator O3 and robot O4, tablet O7, smartphone O2); these objects are in particular able to obtain and/or process a recipe and have the function "cookery" as attribute.

3. group G3 of objects able to respond to the arrival of the user in his household (motion detector O5, lamp O6 and smartphone O2). They have the function "household_presence" as attribute.

It will moreover be noted that:
- a first group (not shown because it is implicit) is the default group of the local area network: all of the objects belong to this group and each object is able to dialog with any other object of the local area network. This group is hereinafter denoted G0.
- the object O7 (digital tablet) has the attribute "media", but is also used for cookery and therefore forms part of groups G1 and G2; generally speaking, one and the same object may communicate over a plurality of groups if it has a plurality of functions.
- the object O2 (smartphone) has a particular role: it is able to manage all of the other objects. It behaves like a "server" object or has a device that performs this function and, preferably, forms part of all of the groups (G0, G1, G2, G3). Within the local area network of objects, consideration is given specifically hereinafter to two types of object:
  - Server objects (OS): these objects make it possible to administer rights and secure discussion groups. They are in particular responsible for distributing security keys that will allow the objects of the various groups to dialog securely and coherently. These server objects may be gateways, smartphones, etc. as in the example of FIG. 2, or any object having sufficient memory and computational capacity to manage the discussion groups and the associated keys (generation, distribution, life-cycle of the keys, etc.). The server objects may be independent objects or be combined to give a single software or hardware module on one of the objects of the local area network. Preferably hereinafter, the server objects are autonomous and have a security element in order to store certain encryption keys and possibly encrypt/decrypt the messages.
  - Client objects (Oi): as discussed above, these connected objects have one or more functional roles, or functions, within the local area network as sender and/or receiver and have computational capacities in order to encrypt and decrypt the messages. They form part of one or more discussion groups under the control of the server object. They preferably have a security element for storing the broadcast keys.

By virtue of this architecture, each object of a group has the means for dialoging securely with the objects of the same group, without the others being able to intercept and decrypt the messages.

Figure 3:
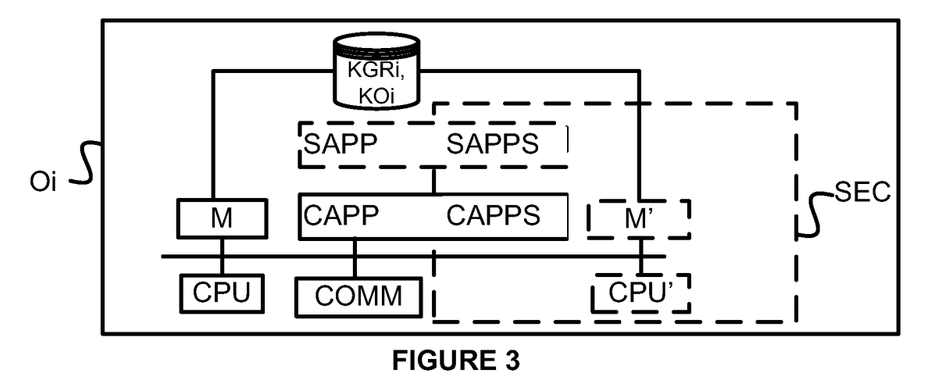
FIG. 3 shows an architecture of an object implementing one embodiment of the invention.

FIG. 3 shows an architecture of an object that implements one embodiment of the invention. In this example, according to FIG. 2, this is one of the objects of the local area network, either a client object (O1-O7) or a server object (O2).

It will be noted that the server object may take several forms:
- dedicated physical object;
- any object having a server module, and therefore able to perform the functions of the server object;
- electronic board performing the role of a computer motherboard, that is to say offering all of the basic functions of a low-price computer (a Raspberry Pi© board from the company of the same name may perform this role);
- module of the home gateway, in particular in the context of a business local area network;
- etc.

The connected object (client and/or server) comprises:
- memories (M) associated with a processor (CPU). The memories may be of ROM (read-only memory) or RAM (random access memory) type. They may take the form of a removable card (SD, flash, etc.). According to the invention, part of the memory M in particular contains the software part CAPP of the client object. If the object has a server module, it also contains an application, denoted SAPP, dedicated to the server function. It also contains a certain number of encryption keys
  - in the case of a server object, the key of the object (server, Ks) and the keys of the various objects and groups managed by the server object; for example, if the server object administers 100 objects distributed into 10 groups, the memory M has to store 110 keys:
    - i) 10 group keys denoted KGRi (i varying from 1 to 10).
    - ii) 100 object keys denoted KOi (i varying from 1 to 100).
  - in the case of a client object, the key of the object (KOi) and the keys of the various groups to which the object belongs; for example, if the object i belongs to 2 groups, the memory M has to store the key of the object KOi and 2 group keys denoted KGRi.
- according to one preferred embodiment, a security element (SEC) itself comprising a processor (CPU') and memories (M'). This security element may be a hardware element (chip card, etc.) or software element (white box, trusted execution environment, etc.). It serves in particular to store what is called the "secure" software part CAPPS of the client object and, if the object has a server module, it also contains an application denoted SAPPS. It also serves to store a certain number of keys, encrypt/decrypt the messages, and securely perform the appropriate computation operations. The keys preferably stored in the security element are:
  - in the case of a client object, the encryption keys of the object i (client key KOi) and of the groups (group key KGRi) to which it belongs;
  - in the case of a server object, the encryption key of the server (Ks), the encryption keys of the objects (client keys KOi) and of the groups (group keys KGRi) of the local area network.

However, some very simple objects may not have security elements, the keys then residing in an unsecured memory. Part of the memory M may in this case contain part of the application CAPP(S) (for example in the form of an applet) and possibly part of the server application SAPP(S).
- a communication module (COMM), preferably a wireless one, for communicating with the other objects of the local area network; this module may be of Wi-Fi, Bluetooth etc. type.

One example of tables in the memory of the client object and/or server is given by way of indication below so as to correspond to the example of FIG. 2. Of course, any other implementation within the scope of a person skilled in the art could be contemplated as an alternative.

A first table TCL in the memory of the server object contains all of the references of the objects managed by the server object. This may more generally be the table of the objects of the local area network. It may be distributed over a plurality of server objects (if there are a plurality of them in the local area network) or centralized on a single server object (for example the service gateway). According to this example:
- column 1 comprises a unique identifier IDi of the object i;

column 2 comprises the encryption key KOi of the object i;

column 3 indicates the function or functions that the object is able to provide, in this example F1 ("media" function), F2 ("cookery" function) and/or F3 ("household_presence" function);

column 4 indicates the reference of the group or groups Gi with which the object is associated;

column 5 indicates the key of the group KGRi.

| Object ID (IDi) | Object key (KOi) | Object function(s) (Fi) | Group reference(s) | Group key(s) |
|---|---|---|---|---|
| IDCL = O1 | KO1 = 123456 | F1 | G1 | KGR1 |
| O2 | KO2 = 7891011 | F1, F2, F3 | All | All |
| O3 | KO3 = . . . | F2 | G2 | KGR2 |
| O4 | KO4 | F2 | G2 | KGR2 |
| O5 | KO5 | F3 | G3 | KGR3 |
| O6 | KO6 | F3 | G3 | KGR3 |
| O7 | KO7 | F1, F2 | G1, G2 | KGR1, KGR2 |

Example of a Table TCL of the Client Objects of the Local Area Network

A second table TGR (group table) in the memory of the server object contains all of the references of the groups managed by the server object:

| Group ID (IDGRi) | Server ID (IDS) | Group key (KGRi) | Group function (Fi) | Client IDs (IDi) |
|---|---|---|---|---|
| G1 | O2 | KGR1 = Fh12m3456 | F1 | O1, O7 [O2] |
| G2 | O2 | KGR2 = . . . | F2 | O3, O4, O7 [O2] |
| G3 | O2 | KGR3 = W2222h | F3 | O5, O6 [O2] |

Example of a Table TGR of the Groups of the Local Area Network each client object contains a table Ti storing its key, its server object(s) and the reference of the groups to which it belongs:

| Object ID (IDi) | Object key (KOi) | Object function(s) (Fi) | Group reference(s) | Group key(s) |
|---|---|---|---|---|
| O7 | KO7 | F1, F2 | G1, G2 | KGR1, KGR2 |

Example of a Table T7 of the Object O7

Figure 4:
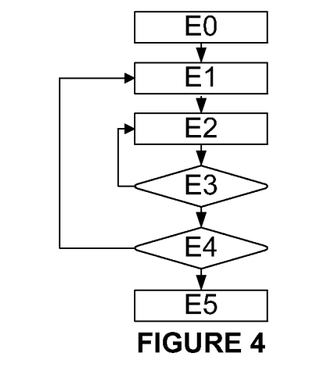
FIG. 4 shows a timing diagram of the general operation according to one embodiment of the invention.

FIG. 4 shows a timing diagram of the general operation according to one embodiment of the invention.

In a step E0, the server object is initialized. This step will be described hereinafter with reference to FIG. 5.

In step E1, a client object i of the local area network is initialized, and in step E2, a group is assigned thereto. These steps will be described hereinafter with reference to FIG. 6.

Step E3 consists in verifying whether there are still groups to be assigned to the object, in particular if the object is capable of performing a plurality of functions and is therefore able to form part of a plurality of groups. If so, and as long as there are still groups to be assigned, step E2 is performed again.

Step E4 consists in verifying whether there are still client objects to be initialized. If so, and as long as there are still objects to be initialized, step E1 is performed again.

If not, the next step is step E5, during which two objects of one and the same group may initiate communication: the first object broadcasts a message on the local area network, and this message is received and may be decrypted and read by all of the objects that belong to the same group.

Figure 5:
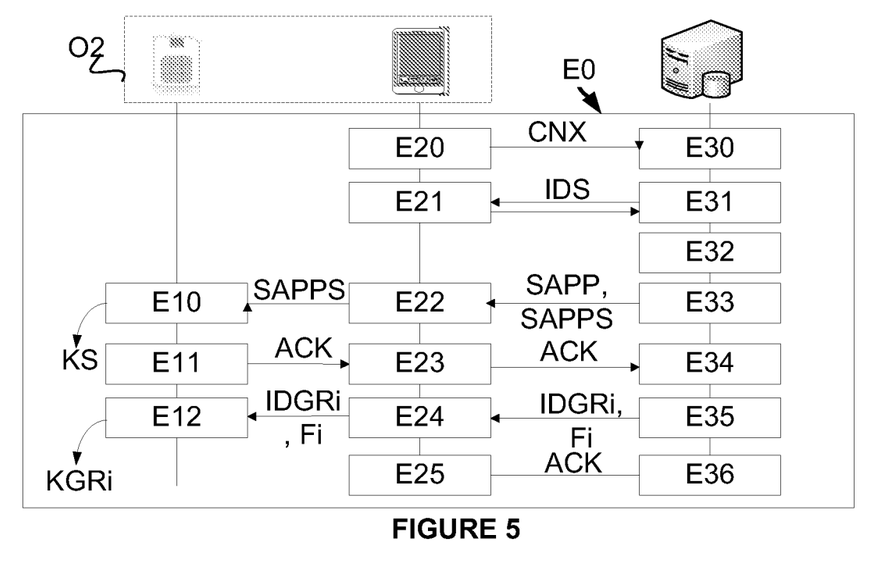
FIG. 5 shows a timing diagram of the initialization of a server object according to one mode of implementation of the invention.

FIG. 5 shows a timing diagram of the initialization of a server object (in this case O2) according to one mode of implementation of the invention, that is to say a detailed description of step E0 of the previous figure.

In a step E20, the client object (potentially server) connects to the local area network for the first time.

The connection request is received in a step E30 by the administration server of the local area network, which may for example take the form of a software module on the home gateway, or on a PC of the local area network, etc.

According to one variant, the object may be initialized when it is manufactured, if its role is already known (client or server object).

Then, in a step E31, the administration server asks the object for its unique identifier (IDS) and receives it in response. The unique identifier, IDS, is stored for example in the memory M of the server object and transmitted to the administration server in a step E21.

In a following step E32, the role of server object is assigned to the object. This assignment may be triggered because the object asked for this role when it connected, or because the object is the first one to connect, or because the object has a particular feature linked for example to its function (smartphone, able to manage all of the connected objects of the network, PC, etc.), etc.

At the end of this step, the server application may be transferred to the object (E33, E22), for example in the form of a download. It is recalled that the application SAPP of the object preferably comprises a secure part, for example an applet, SAPPS, intended to be installed in a secure memory/area of the object, in this case in a step E10. This memory may be a hardware memory or software memory. The application SAPP comprises at least a storage module and a module for managing communications on the network. The application SAPPS for its part comprises a security module dedicated to managing the keys (generation, distribution, storage, encryption etc.).

Once the application has been installed in steps E22 and E10, the encryption key KS of the server may preferably be generated and stored in the secure memory.

An acknowledgement may then be transmitted to the administration module (steps E11 and E23).

In a step E35, the administration module requests generation of one or more group keys KGRi. According to a first example, these groups are known to the administration tool that transmits them to the server object with the associated functions. For example, the request may consist in transmitting, to the server object, a group G1 identifier IDGR1 to be associated with the "media" objects, and the associated function is denoted F1, and then a group G2 identifier IDGR2, etc. For each group, the server object generates an encryption key KGRi in a step E24/E12. The server object preferably asks its security module to generate and store a key (KGRi) for each of the groups in a step E12. They may possibly be relayed to the administration module. At the end of this step, an acknowledgement may be transmitted to the administration module (E25).

The server object is initialized and therefore has:
- the server application (SAPP+SAPPS), part of which may be located in the security element if it has one;
- a server object identifier (IDS), for example a digital reference encoded on 8 bytes;
- the encryption key of the server object (server key Ks) in the secure memory;
- group identifiers (IDGRi) associated (or to be associated subsequently) with "functions" Fi of objects to be grouped into groups Gi ("media", "cookery", "household_presence", etc.); these group identifiers may be:
  - standardized; if one and the same function is able to be shared in different local area networks (for example objects processing patient data in hospitals, machines with a common function in different industrial sites, etc.), it will preferably be standardized in an appropriate body. In this case, they may be pre-installed in the object (during production, in store, etc.) and/or evolve over time depending on the needs of the administrator of a local area network. Reference is in this case made to a "standardized" group.
  - freely defined by the user (or administrator of a local area network): if a function is specific to the wishes of the user, said user may himself define his groups (media objects, objects for cookery, etc.). To this end, he will have to write the groups to the memory of the server module, for example via an appropriate human-machine interface, via the local area or wide area network (by updating the firmware of the object, etc.). Reference is in this case made to a "free" group.
- encryption keys (KGRi) for the various groups (Gi). Various cases may arise. It will be noted that it is therefore necessary to provide for the management of the life-cycle of the keys in each case, but this is outside of the scope of the present invention.
  i. if the group has an identical key in the various local area networks (for example a plurality of hospitals), the group key may be pre-installed during production (and thereafter evolve according to needs);
  ii. if the keys, even though they correspond to the same function, are different in the various local area networks, for example in the case of industrial local area networks with similar activities belonging to different companies, they may be installed (or updated) when the server object is initialized in the local area network.
  iii. if the keys are specific to the local area network, in particular in the case of a "free" group, their life-cycle depends on the choices of the user (they may for example be created and stored in the memory of the object at the same time as the group identifier).

Figure 6:
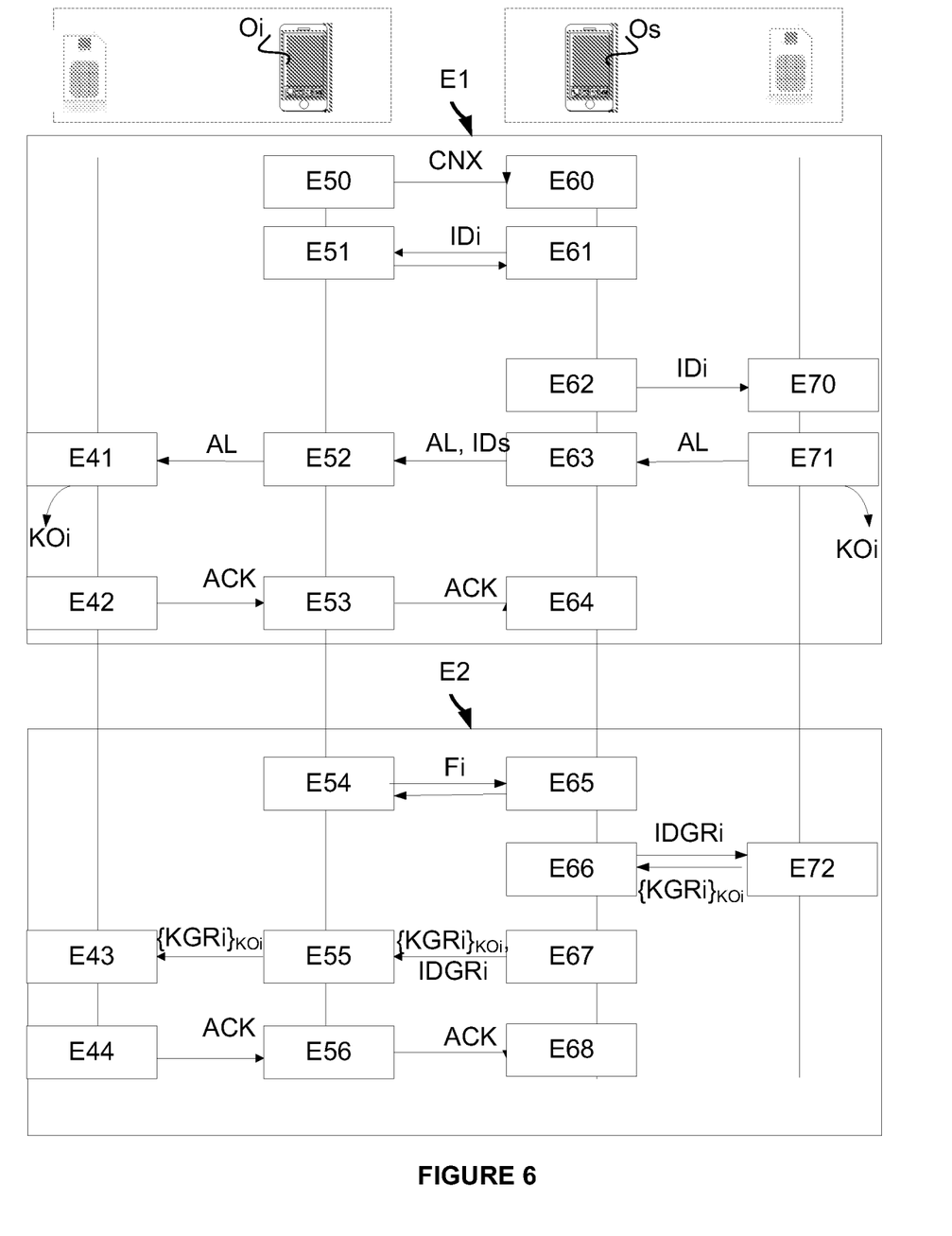
FIG. 6 shows a timing diagram of the initialization of a client object according to one mode of implementation of the invention, and of the assignment of a group to a client object according to one mode of implementation of the invention.

FIG. 6 shows a timing diagram of the initialization of a client object according to one mode of implementation of the invention, and of the assignment of a group to a client object according to one mode of implementation of the invention. It in particular shows the arrival of a new client object in a discussion group.

It is assumed that the client object is already initialized in a previous step, that is to say that it has:
- "functions" Fi of the object ("media", "cookery", "household_presence", etc.) that are standardized or determined by the user;
- a client object identifier, IDi, for example a digital reference encoded on 8 bytes;
- an application CAPP that has been transferred to the object, for example in the form of a download. It is recalled that the application CAPP of the object preferably comprises a secure part, or applet, CAPPS, intended to be installed in a secure memory/area of the object. This memory may be a hardware memory or software memory. The application CAPP comprises at least a storage module and a module for managing communications on the network. The application CAPPS for its part comprises a security module dedicated to managing the keys (generation, distribution, storage, encryption, etc.).

In a step E50, the client object Oi connects to the local area network for the first time. The connection request is received by the server object Os in a step E60.

Then, in a step E61, the server asks the object for its unique identifier (IDi) and receives it in response. After verifying that the server does not know this object, it launches the procedure of adding a new object. The unique identifier, IDi, is stored for example in the memory of the server object and transmitted to the security element in a step E62.

Upon receiving this identifier of a new object, the security element of the server object generates a random (AL) and an encryption key KOi for this object (step E71). The key KOi is generated on the basis of this random and of the unique identifier of the object, IDi.

The random is transmitted from the server to the object in a step E63, along with the identifier (IDs) of the server. By virtue of the random received in a step E52 and transmitted to the security element of the object if it has one, the client object is able to generate an encryption key KOi identical to that of the server (on the basis of the random and of the unique identifier of the object, IDi) in a step E41. This key is preferably stored in a secure memory of the object.

An acknowledgement may then be transmitted to the server from the security element of the object (steps E42, E53, E64).

Following this first phase of initializing the object, the server may proceed to attaching the client object to a group (step E2 in FIG. 4).

To this end, in steps E65-E54, the server and the object exchange the functions of the client object. It is recalled that the function or functions Fi associated with the object ("media", "cookery", "household_presence", etc.) are or are not standardized.

In a step E66, the server then selects the group Gi to which the object should belong, that is to say the group (or the groups) corresponding to the function (or the functions). In a step E72, it then recovers an encryption key of the group for the object, that is to say a group key KGRi encrypted by the key of the object (KOi), denoted $\{KGRi\}_{KOi}$, by virtue of its security element, to which it has transmitted the identifier of the group (IDGRi) and of the object (IDi).

The group identifier (IDGRi) and the encrypted group key ($\{KGRi\}_{KOi}$) are then transmitted to the client object in a step E67. The group identifier may be stored in the object in a step E55. The group key may preferably be stored in its security element (step E43).

An acknowledgement may then be relayed to the server in steps E44 and E56.

Following this second assignment phase, the client object Oi therefore has identifiers of the group(s) (IDGRi) associated with "functions" Fi of the object ("media", "cookery", "household_presence", etc.) and the corresponding encryption keys (KGRi).

Communication between two client objects wishing to dialog thereafter takes place as follows: a message M broadcast on the local area network is encrypted by the group key of the discussion group ($\{M\}_{KGRi}$) and accompanied by the reference of the intended group (since the client objects may belong to a plurality of groups), IDGRi. Such a message will be able to be decrypted only by an object belonging to the same discussion group, holding the group key KGRi.

It goes without saying that the embodiment described above has been given purely by way of indication and without any limitation, and that numerous modifications may easily be made by a person skilled in the art without otherwise departing from the scope of the invention.

The invention is in particular not limited to the context of the local area network: the concept of a group may be applied to communication between a plurality of local area networks, such as for example the networks 1 and 1' in FIG. 1. To this end, it is enough to register the local server (of the first local area network 1) with an external network (the second local area network 1'). After being registered on an external server (for example the server object O2'), the local server (O2) has a key that gives it access to the field of discussion with a local group of the external server. An external group key is stored in the memory of the server object in the same way as a local group key. By virtue of this key, the local server is able to dialog with a group of the external server: this makes it possible to easily expand the network.

The invention claimed is:

1. A method performed by a server object of a first local area network of a communication network, said server object being in charge of forming groups of client objects of said first local area network, the method comprising:
   upon a connection, for the first time, of a first client object to said first local area network, adding said first client object to client objects managed by said server object, said adding comprising obtaining an encryption key of said first client object and receiving at least one functional attribute of said first client object;
   assigning said first client object to a first group of client objects of said communication network on the basis of said received at least one functional attribute;
   encrypting an encryption key of the first group using an encryption key of the first client object; and
   transmitting to said first client object identifier of the first group, in association with the encrypted encryption key of the first group.

2. The method as claimed in claim 1, wherein the assigning act is further performed on the basis of at least one function of the first group.

3. The method as claimed in claim 1, wherein said server object is configured to generate and store the encryption keys of groups of client objects of said first local network.

4. The method as claimed in claim 3, wherein the communication network comprises at least two local area networks, and the method comprises the following acts:
   establishing communication with a second server object of a second of said at least two local area networks;
   sending, to the second server object, an encrypted encryption key and the identifier of a group of clients objects of said first local area network;
   communicating data between the first server object and the second server object in order to establish secure communication between a first client object of said group and a second client object of the second local area network.

5. The method as claimed in claim 1, wherein the client objects of the first local area network belong to at least one group of client objects.

6. The method as claimed in claim 1, wherein the first local area network comprises a default group and wherein the client objects of the first local area network are assigned to said default group.

7. The method of claim 1 wherein said method comprises initializing said server object by installing a server application transferred by an administration server of said first local area network.

8. The method of claim 7 wherein said initializing is performed when said server object connects for the first time to said first local area network.

9. The method of claim 7 wherein said initializing is performed when said server object is manufactured.

10. The method of claim 1 wherein said assigning to the first group is performed upon connection, for the first time, of said first client object to said communication network.

11. A method performed by a first client object of a first local area network of a communication network, wherein said method comprises:
   upon connecting for the first time to said first local area network, obtaining an encryption key of said first client object via a server object of said first local area network, and transmitting at least one functional attribute of said first client object to said server object;
   receiving from said server object an identifier of at least one first group of at least one client object in the first local area network, associated to said at least one functional attribute of said first client object and an encrypted encryption key of the first group;
   decrypting the encrypted encryption key of the first group using the obtained encryption key of the first client object; and
   communicating with client objects of said first group by encrypting a message using the decrypted encryption key of the first group and sending said encrypted message to client objects of said communication network in association with the identifier of the first group, or upon receiving an encrypted message from a second client object of said communication network in association with said identifier of said first group, decrypting a-said received message using the decrypted encryption key of the first group.

12. A server object for forming groups client objects of a first local area network of a communication network, said server object comprises:
   at least one processor; and
   at least one non-transitory computer-readable medium comprising instructions stored thereon, which when executed by the at least one processor configure the server object to perform acts comprising:
   upon a connection, for the first time, of a first client object to said first local area network, adding said first client object to client objects managed by said server object, said adding comprising obtaining an encryption key of said first client object and receiving at least one functional attribute of said first client object;
   assigning said first client object to at least one first group on the basis of said at least one functional attribute of said first client object;
   encrypting an encryption key of the first group using said obtained encryption key; and transmitting to said first client object an identifier of the first group in association with the encrypted encryption key of the first group.

13. A home gateway comprising the server object as claimed in claim 12.

14. A first client object of a first local area network of a communication network, wherein said client object comprises:
- at least one processor; and
- at least one non-transitory computer-readable medium comprising instructions stored thereon, which when executed by the at least one processor configure the first client object to perform acts comprising:
  - upon connecting for the first time to said first local area network, obtaining an encryption key of said first client object via a server object of said first local area network, and transmitting at least one functional attribute of said first client object to said server object;
  - receiving, from said server object, an identifier of at least one first group of at least one client object in the first local area network, associated to said at least functional attribute of said first client object and an encrypted encryption key of the first group;
  - decrypting the encryption key of the first group using the obtained encryption key of the first client object; and
  - communicating with client objects of said first group by encrypting a message using the decrypted encryption key of the first group and sending said encrypted message to client objects of said communication network in association with the identifier of the first group, or upon receiving an encrypted message from a second client object of said communication network in association with said identifier of said first group, decrypting said received encrypted message using the decrypted encryption key of the first group.

15. The method of claim 14 wherein said method comprises initializing said first client object by installing a client application transferred by an administration server of said first local area network.

16. The method of claim 15 wherein said initializing is performed when said first client object connects for the first time to said first local area network.

17. The method of claim 15 wherein said initializing is performed when said first client object is manufactured.

18. A non-transitory computer-readable medium comprising a computer program stored thereon, the program comprising code instructions that, when the program is executed by a processor of a first client object in a communication network, implements a method for communicating, wherein said instructions configure the first client object to perform the following acts:
- upon connecting for the first time to said communication network, obtaining an encryption key of said first client object via a server object of said communication network, and transmitting at least one functional attribute of said first client object to said server object;
- receiving, from said server object, the identifier of a at least one first group of at least one client object in the communication network, which is associated to said at least one functional attribute of said first client object and an encrypted encryption key of the first group;
- decrypting the encryption key of the first group using the obtained encryption key of the first client object; and
- communicating with client objects of said first group by encrypting a message using the decrypted encryption key of the first group and sending said encrypted message to client objects of said communication network in association with the identifier of the first group, or upon receiving an encrypted message from a second client object of said communication network in association with said identifier of said first group, decrypting a received encrypted message using the decrypted encryption key of the first group.

* * * * *